United States Patent [19]

Patton et al.

[11] Patent Number: 5,774,752

[45] Date of Patent: Jun. 30, 1998

[54] PROCESSING OF SOUND MEDIA WITH STILL IMAGE FILMS IN PHOTOFINISHING LABS

[75] Inventors: David L. Patton, Webster; Stephen J. Rowan, Spencerport; Cynthia S. Bell, Webster, all of N.Y.

[73] Assignee: Eastman Kodak Company, Rochester, N.Y.

[21] Appl. No.: 773,158

[22] Filed: Dec. 26, 1996

[51] Int. Cl.$^6$ ................................................. G03B 17/24
[52] U.S. Cl. ................................................................ 396/312
[58] Field of Search .............................................. 396/312

[56] References Cited

U.S. PATENT DOCUMENTS

| | | | |
|---|---|---|---|
| 5,128,700 | 7/1992 | Inoue et al. | 396/312 |
| 5,313,235 | 5/1994 | Inoue et al. | 354/76 |
| 5,387,955 | 2/1995 | Cocca | 354/76 |
| 5,521,663 | 5/1996 | Norris, III | 354/106 |

*Primary Examiner*—Russell E. Adams
*Attorney, Agent, or Firm*—Francis H. Boos, Jr.

[57] ABSTRACT

A method of processing photographic still image film orders having sound information recorded at the camera in association with one or more images captured on the film in which the sound information is downloaded at an order entry station to create a sound file for transfer to the photofinishing laboratory. Order identification data linking the recorded sound information to the film order is created and assigned to the sound file and the film order. The order identification data is employed at the photofinishing laboratory to create a sound recording medium from the sound file which is linked to prints produced from the film order, the sound recording medium then being attached to the image prints using the linking order identification data. Sound information associated with individual image prints may also be accumulated and recorded on a single sound recording medium for attachment to an index print produced from the film order.

22 Claims, 13 Drawing Sheets

PROCESSING OF SOUND MEDIA WITH STILL IMAGE FILMS IN PHOTOFINISHING LABS

FIELD OF THE INVENTION

The invention relates generally to the field of photographic still images having recorded sound associated with the still image. In one aspect, the invention relates to a photofinishing method and apparatus for obtaining a film with recorded sound order from the consumer, producing the associated prints and/or index print with said sound data extracted and recorded on a memory device attached to the prints, and returning the film and resultant sound-on-print order to the correct consumer.

BACKGROUND OF THE INVENTION

Sound with image print technology is known in which the camera records sound on a separate medium and the user then retains possession of the recorded sound on the sound medium while the film is processed and the images printed at a photofinishing lab. The user then reunites the sound medium with the image print when the image prints are retrieved from the photofinisher. This has the drawback that the user must correlate the sound device with prints which can be a cumbersome process. U.S. Pat. No. 5,313,235 discloses a camera that records sound on a separate medium and exposes an image frame identifying bar code on the film negative. The bar code is subsequently exposed onto the image print during photofinishing. The code serves as a print image identifier which associates the print with a sound segment recorded on the separate medium. A sensor connected to a separate playback device reads the code on the print and addresses the associated sound segment in the separate medium for sound playback. A problem with this approach is that the identifying code is exposed directly onto the negative. To insure its success it must be exposed in the image area thus winding up as part of the image on the image print. Due to variances in photofinishing printing and user selection of camera orientation during picture taking, the resultant location of the code on the print can vary substantially making its orientation in a code reading device variable thus making it difficult to produce sound based on reading of the code. Another problem is that the card is not directly attached to the image print and is thus susceptible of becoming separated from the associated print and lost. U.S. Pat. No. 5,521,663 discloses recording of the sound by the camera directly onto the film using a latent image binary code. The binary code is imaged onto the print at the time the print is exposed. The code is decoded into sound by a scanner in the playback device. This has the drawback of using up valuable image area on the image print for the sound code. Another drawback is that when index print imagettes are produced from images bearing this code, the reduced size of the code on the imagette makes it difficult if not impossible to reproduce the sound from the sound code on the imagette. The method also does not readily allow the user to re-record sound for a specific print or to transfer recorded sound from one print to another.

SUMMARY OF THE INVENTION

In view of the above-described problems of the prior art, it is an object of the present invention to provide a method of photofinishing film with associated sound recordings linked to the film order that allows transfer of the sound onto a separate sound memory device that can then be attached to the image prints such that the sound may be heard when the print or index print is placed into the playback device.

A further object of the invention is to provide a method for linking sound recorded at a camera on a removable sound recording device with a film photofinishing order in such a manner as to allow the user to retain possession of the sound recording device for re-use with another roll of film.

A further object of the invention is to provide a method for the retailer to collect and create a batch file of consumer sound orders in which the sound order batch is transmitted via electronic transmission, e.g. a modem, to the photofinishing site with suitable linking identification so that the photofinisher can link the transmitted sound order batch to the associated batch of consumer film orders.

Yet another object of the invention is to provide a photofinishing method of producing an index print with the associated sound for all the associated images on the index print as an integral part of the index print.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the drawings:

FIG. 8 is a flow diagram showing how the sound data files are created and transmitted from a retailer order station to a photofinishing lab.

DETAILED DESCRIPTION OF THE INVENTION

Figure 1:
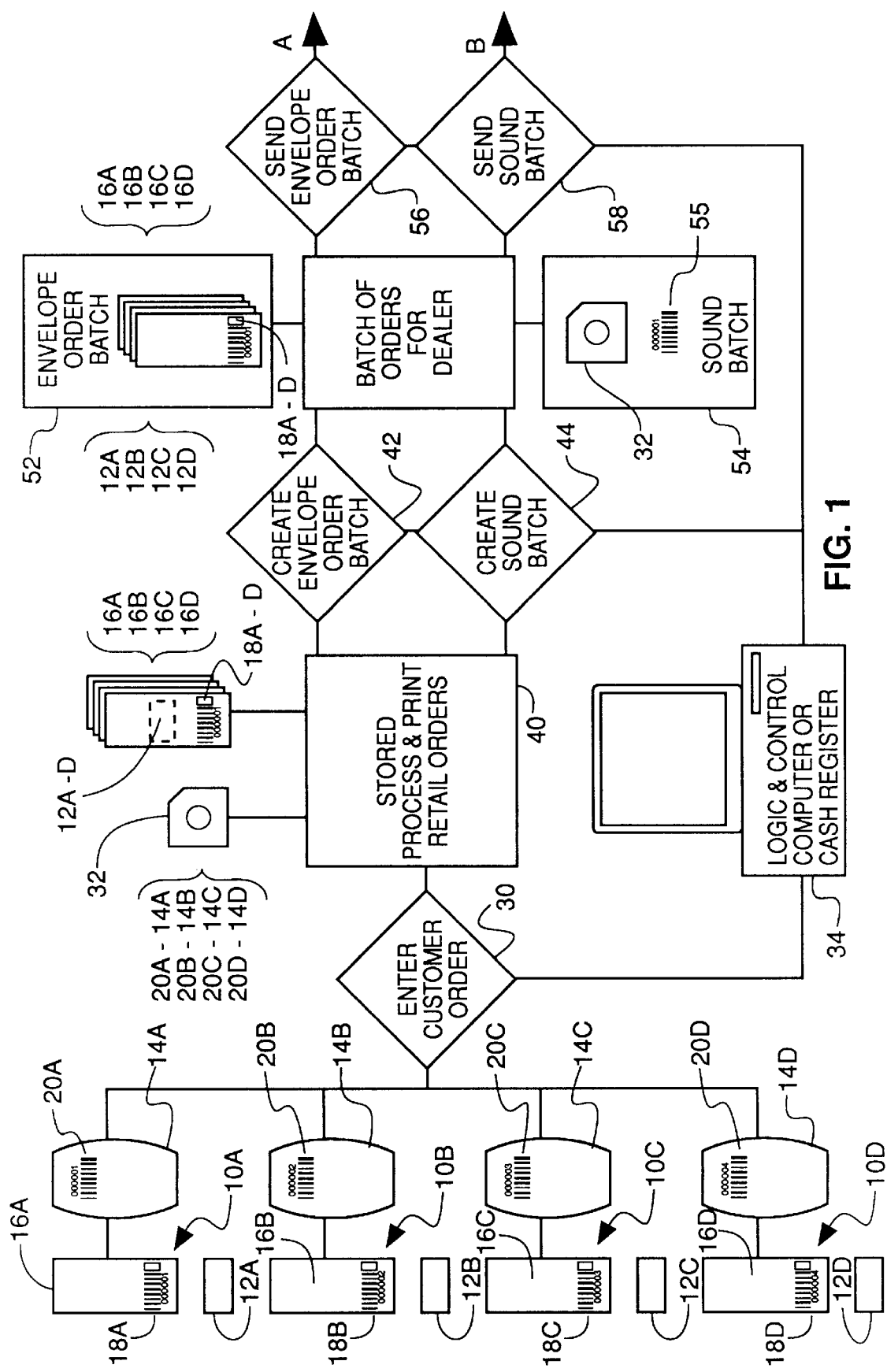
FIGS. 1–3 are flow diagrams illustrating successive stages of a method for the creation and processing of sound-on-print orders for 35 mm film beginning at retail order taking, progressing through a photofinishing lab and concluding with attaching of sound record devices to photographic prints in accordance with the present invention.

Referring to the drawings in detail, and more particularly to FIG. 1., FIG. 1 is a flow diagram showing the steps used in creating a batch of sound-on-print photofinishing orders at the retail counter.

The customer brings a sound-on-print order 10A to the retail order entry point. This may be either an order entry station only, such as a drugstore, where orders are accumulated and batched for submission to a central photofinishing lab. Alternatively, it may be a minilab location at which order entry, film processing and printing are done on location. The phrase "sound-on-print order" as used herein means a roll of photographic film on which images have been exposed combined with memory means on which sound bites associated with one or more of the images have been recorded. Thus the order 10A comprises the customer's roll of film 12A and the customer's sound card 14A, on which sound bites have been recorded at the camera, that corresponds to that roll of film. For illustrative purposes, four separate customer orders are shown designated as 10A–10D and respectively comprising film rolls 12A–12D, sound cards 14A–14D, and order envelopes 16A–16D. The orders are customarily placed in a separate envelope for each film order. Each envelope is identified by a unique 6 digit bar coded and eye-readable order ID number 18A–18D, respectively. Each sound card is identified by a unique bar coded and eye-readable number 20A–D, respectively. The unique sound card ID number is preferably also encoded electronically in the card to match the bar coded and eye-readable number on the outside of the card. At the order entry point 30, either the customer or the retail order clerk fills out the order envelope. From this point, until the order reaches the photofinishing lab, the customer's roll of film remains inside the order envelope.

At the order entry point 30, the customer's sound card 14 may be placed into the order envelope 16 along with the customer's film 12. The sound card can remain in the envelope 16 until the sound is downloaded and transferred to a sound recording medium ("sound chip") for attachment to individual prints or to an index print during photoprocessing as described below. Alternatively, in the case in which film orders are to be transported to a central photofinishing lab, the sound will more likely be downloaded from the customer's sound card 14A by the clerk and stored on a storage medium 32, such as a floppy disk, in the form of a sound file that is electronically linked to the customer's film order envelope 16A containing the customer film 12A via a computer 34. As shown in the drawing, the sound card is removable from the camera. In some cameras, as an alternative to a removable sound card, the sound information can be recorded in an integral memory in the camera. In such instance, the sound is downloaded directly from the camera to a storage medium 32. The downloading may be accomplished by, for example, cable link, infrared link or other known forms of electronic communication. The linkage between the sound information and the customer's film order relies on using the unique order ID number 18A on the envelope 16A and a unique identification number associated with the sound information. In the case of sound information recorded on a removable sound card, this would be sound card ID number 20A on the sound card 14A. In the case of sound information downloaded as a sound file from integral camera memory, it would be a unique number created in the camera memory similar, for example, to a camera serial number. As a further alternative, the downloaded sound information can be communicated as a sound file with the linking identification number directly to a photofinishing laboratory by modem or other suitable communication means. The same procedure is also followed for customers' orders 10B–10D resulting in the downloaded data from the sound cards 14B–D being stored on sound storage medium 32. Further details concerning the order entry procedure for downloading of the sound bites are discussed later.

Included in the order entry batching process, the storage medium 32 and corresponding film 12A–12D are accumulated with other orders at the retail counter storage point 40. Block 42 designates the point at which customer orders 10A–10D being stored at the retail counter storage point 40 are combined into batch 50 for transfer to the photofinishing lab. At block 44 all the sound recordings from sound cards 14A–14D identified by sound card ID numbers 20A–20D corresponding to the orders 10A–10D in envelope batch 52 are combined to form sound order batch 54. The envelope batch 52 comprises the customer's envelopes 16A–16D containing the customer's film rolls 12A–12D. The orders in envelope batch 52 are linked by the ID number 18A–18D on the envelopes to the corresponding sound card in sound order batch 54 by the unique sound card ID number 20A–20D stored on the storage media 32. The sound order batch itself is linked to the storage media 32 and to the envelope order batch by a unique sound order batch number 55. After the creation of the customer envelope order batch 52 and the customer sound order batch 54, both the batches 52 and 54 are transferred to the photofinisher designated by the send blocks 56 and 58 respectively.

Figure 2:
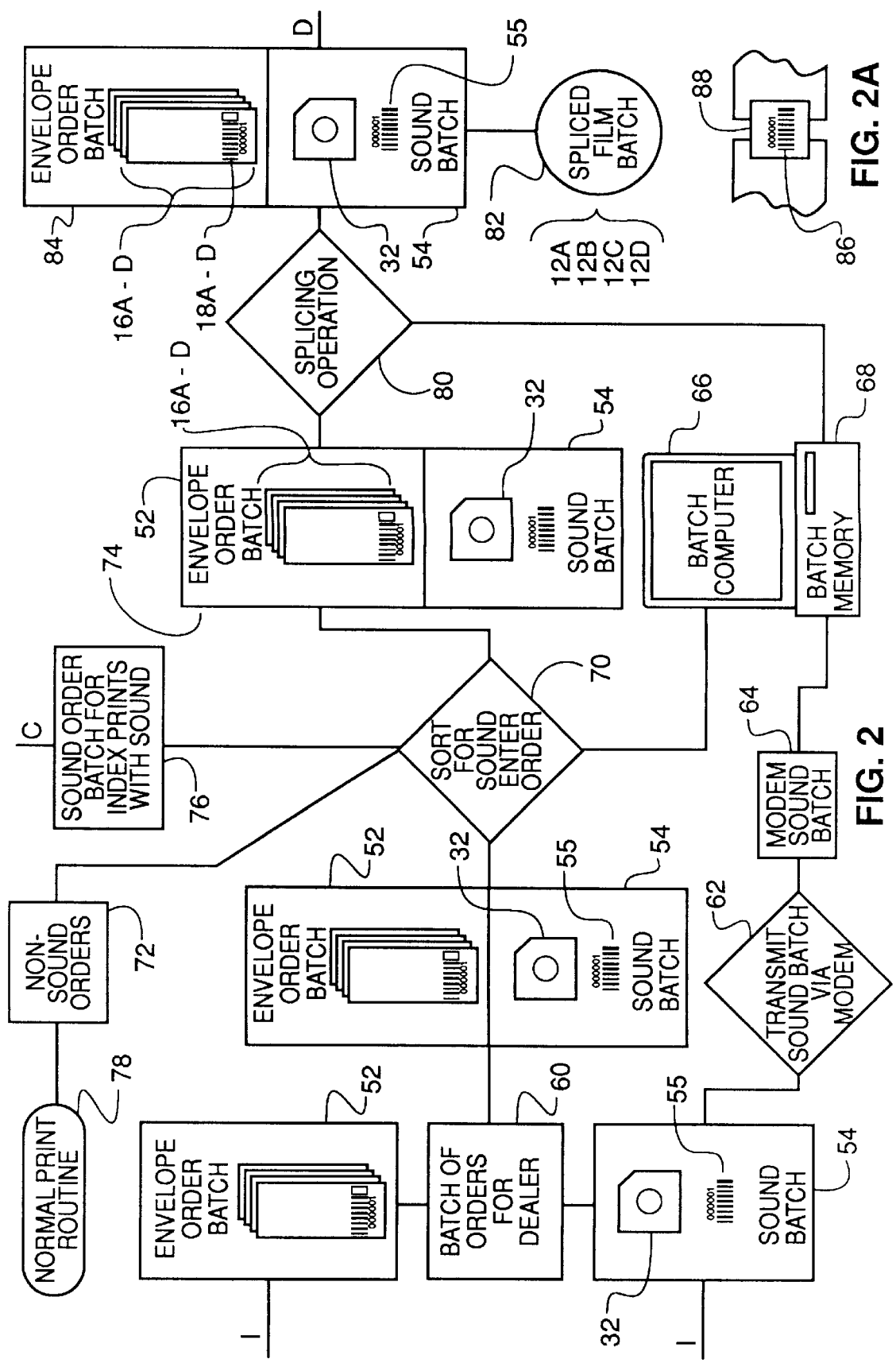

FIG. 2 illustrates a portion of the flow diagram from the point of reception of the customer orders at the photofinishing lab through order sorting and splicing of film orders for processing (development). The envelope sound order batch orders can be transported via van or truck in which case the sound order batch 54 is placed directly with the envelope batch 52 and is now shown as order batch 60. Another method of transferring the sound order batch orders to the photofinisher is to transport the envelope batch 52 via van or truck and transmit via modem 62 the sound order batch 54 to the photofinisher as a modem sound order batch 64. The modem sound order batch 64 is received by the photofinisher's batch computer 66 and stored in the batch memory 68. As the photofinisher receives the batches 60 from the retailers, the batches 60 are sorted at step 70 into non-sound orders 72, orders with sound where the sound will be attached to each print 74, and orders with sound where the sounds will be attached to an index print printed for each order 76. Non-sound orders 72 are sent through the normal photofinishing line 78. Orders with sound where the sounds will be attached to an index print printed for each order 76, are sent to the branch designated "C". Orders with sound where the sound will be attached to each individual print 74, are sent to the splicing operation 80. It is also determined at the order sort 70 if the sound for the sound orders came in with the sound orders on recording media 32 or if the sounds for the orders where transmitted as a modem sound order batch 64 to the batch computer 66 and are now in the batch computer memory 68. At the splicing operation 80 the film rolls 12A–12D are removed from the envelopes 16A–16D and are spliced together to form spliced film batch 82. The envelopes with the film removed now form envelope (without film) batch 84. It is at the splicing operation 80 where the envelopes 16A–16D are linked to the film rolls 12A–12D via a unique bar coded and eye-readable ID number 86 on each film splice 88 and the 6 digit bar coded and eye-readable number 18A–18D on each envelope. Each roll of film has its own unique splice number 86. The splice number 86 is linked to the envelope via the batch computer 66. If the sound for each order is on the sound recording medium 32, the sound recording medium remains with the empty envelope batch 84. If the sound for each film order was transmitted from the retailer as a modem sound order batch 64, the sound order batch now also resides in the batch computer memory 68. The sound bites for each order in the modem sound order batch 64 is linked via the batch computer 66 by the unique sound order identifier numbers 20A–20D (see FIG. 1) with the empty envelope batch 84 via the 6 digit bar coded and eye-readable number 18A–18D on each envelope, respectively, and with the sound order batch number 55. At this point the envelopes, films and sounds are linked together by their unique identifying number via the batch computer 66. The sound orders 84/54 for which individual sound bites will be attached to each respective print now branch to "D".

Figure 3:
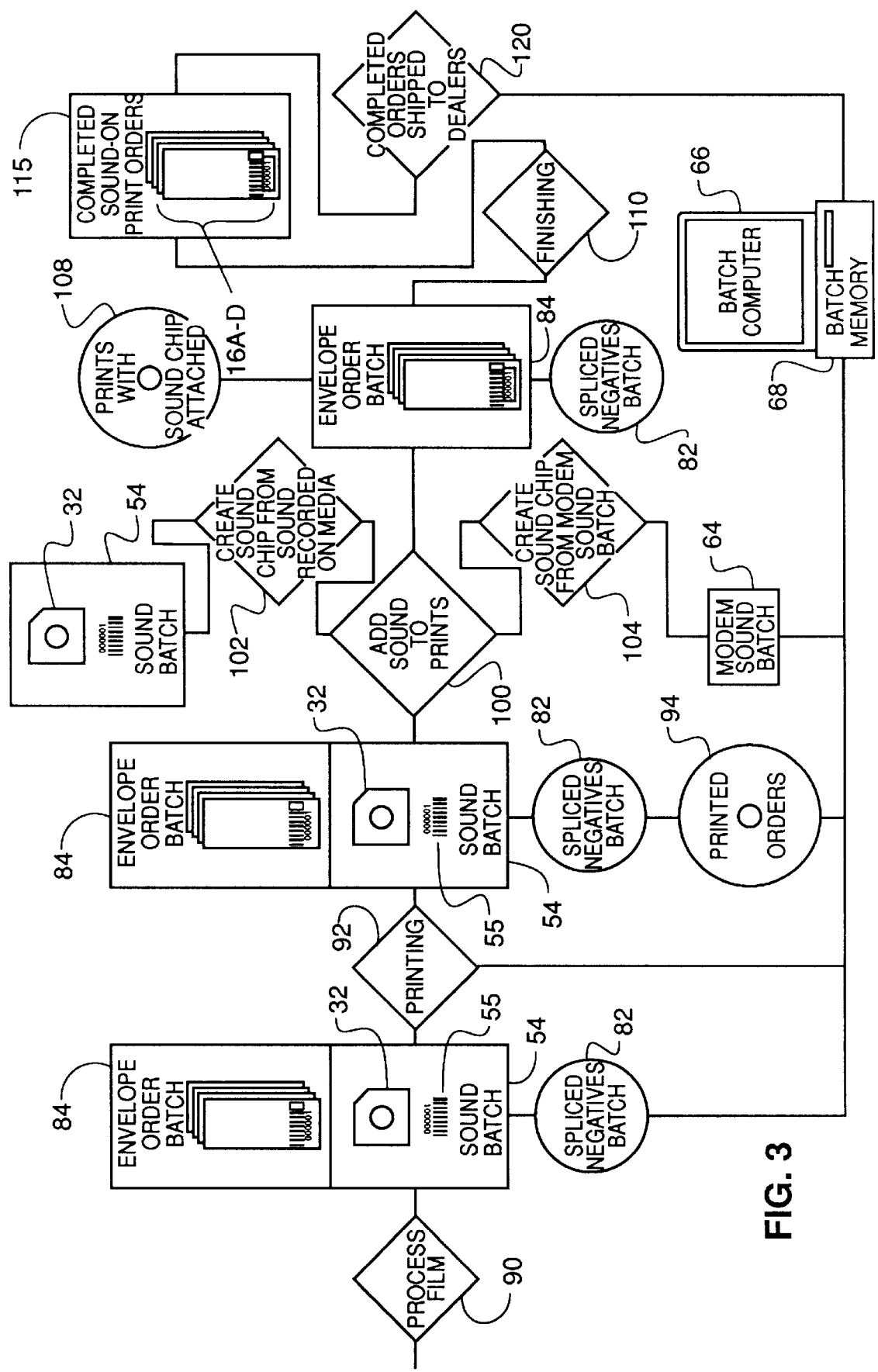

In FIG. 3, there is shown continuation of the photofinishing process from the processing (development) of the film to the final step of returning the completed order to the retail dealer. The batch of sound-on-print orders shown in FIG. 3 is characterized by the fact the various sound bites associated with individual prints will be attached to each respective print. The empty envelope batch 84, sound order batch 54, and spliced film batch 82 (shown in FIG. 2) enter the flow diagram at "D". The information linking these batches together is stored in the batch memory 68 in the batch computer 66. The spliced film batch 82 (shown in FIG. 2) is processed at block 90. After processing, the film negative batch 82 is reunited with the empty envelope batch 84 and with sound order batch 54 containing sounds from sound cards 14A–14D recorded on sound recording medium 32. The batches 84,82,54 remain linked in the batch computer 66 by the unique identification numbers 86, 55, and 18A–18D. The sound-on-print batch now goes to block 92 where the spiced film negative batch 82 is printed on a continuous web of photographic print paper. A set of prints for each order is made at printing block 92 forming the print order batch 94 on a reel. The print order batch 94 is combined with the film negative batch 82 containing the spliced film rolls 12A–12D, (FIG. 2) the envelope batch 84 containing envelopes 16A–16D (FIG. 2), respectively, and with sound order batch 54 containing sounds recorded from sound cards 14A–14D on sound recording medium 32. The combined batches 94, 84, 82 and 54 now proceed to block 100. At this point in the process, EPROM sound chips are created at block 102 in known manner from the sound bites recorded on the sound recording medium 32 contained in sound batch 54. If the retailer chose to send the sound order batch containing the sound recordings derived from sound cards 14A–14D to the photofinisher via a modem creating a modem sound order batch 64 that was stored by the batch control computer 66 in the batch computer memory 68, the sound chips are created at block 104 directly from the sound bites recorded in batch memory 68 utilizing the unique sound card ID numbers 20A–20D (FIG. 1), film ID number 86 and the unique envelope ID numbers 18A–18D. The resultant sound chips are then attached to the back of each print at step 100 to form the individual sound-on-prints. The batch of prints with their associated sound chips attached create sound print batch 108 which is combined with the film negative batch 82, and the empty envelope batch 84. The combined batches 84, 82, and 108 proceed to the finishing operation block 110. At the finishing operation 110 the spliced film batch 82 is cut apart into the separate orders 10A–10D, combined with the sound prints and placed into envelopes 16A–16D, respectively, thus forming the completed sound-on-print batch 115 which is then sent back to the retailer at step 120 in normal manner.

Figure 4:
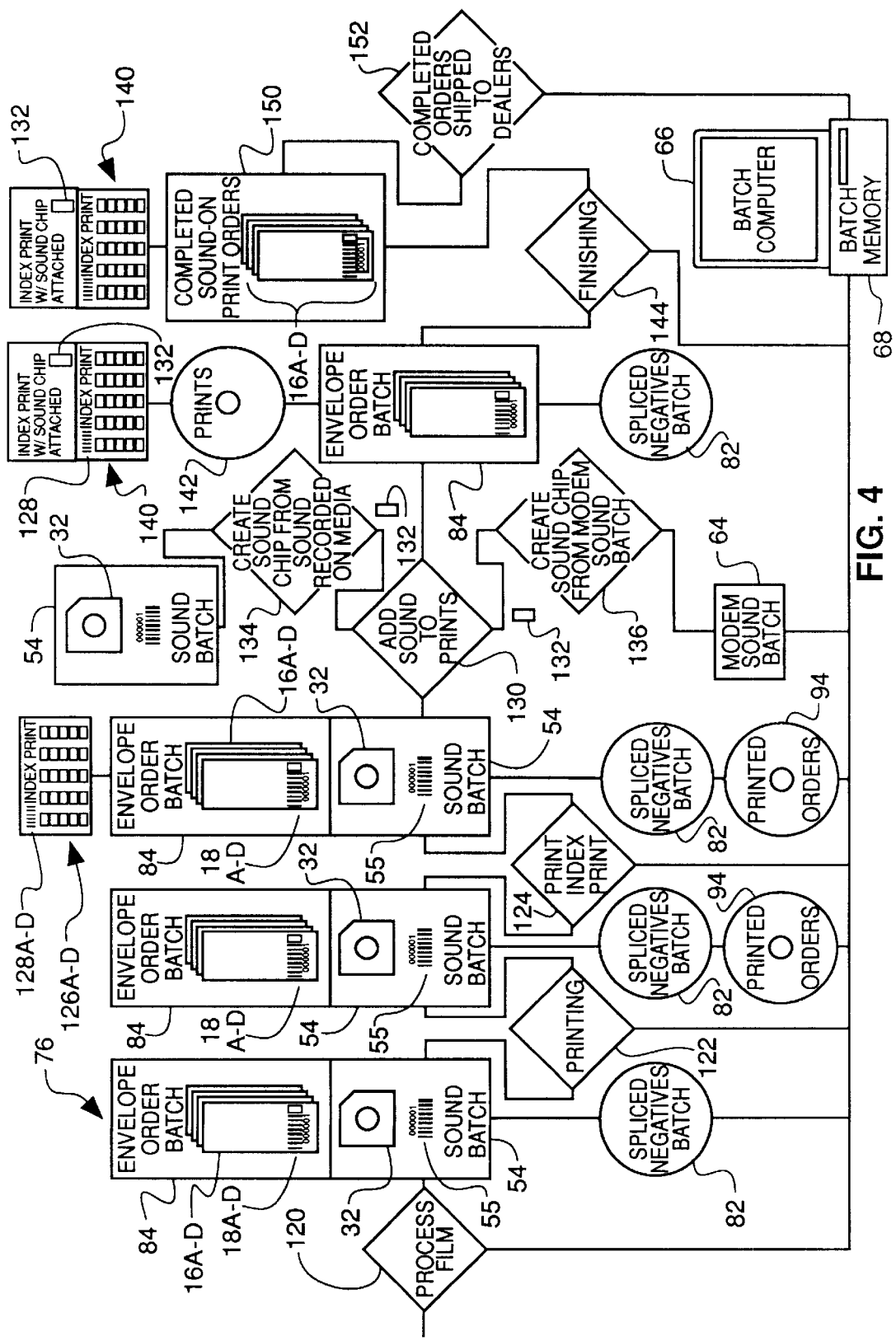
FIG. 4 is a related flow diagram showing the route taken by a batch of sound-on-print orders through the photofinishing lab in which a sound recording associated with each film image in an order is attached to an index print for that order.

Referring now to FIG. 4, there is shown a modified continuation of the flow diagram in FIG. 2 in which the route taken by a batch of sound-on-print orders though the photofinishing lab is characterized by the fact that all the sound bites for each order are recorded onto one sound chip that becomes attached to an index print for that order. The index print contains all the images in that order. The index print envelope batch 76, sound order batch 54, and film batch 82 from FIG. 2 enter the flow diagram of FIG. 4 at "C". The information stored in the batch memory 68 of the batch computer 66 links the orders in batch 76 together. The spliced film batch 82 is processed at block 120. After processing, the film negative batch 82 containing the spliced film negative rolls 12A–12D is reunited with the envelope batch 76 containing the empty order envelopes 84 and with sound order batch 54 containing sound bites on sound recording medium 32. The batches 82, 76, and 54 remained linked in the batch computer 66 by the unique identification numbers 86, 55, and 18A–18D. The sound-on-print batch 84 now goes to block 122 where the spiced film negative batch 82 is printed. A set of prints for each order is made at printing block 122 forming the print order batch 94. The print order batch 94 is combined with the film negative batch 82 containing the spliced film rolls 12A–12D, the envelope batch 84 containing envelopes 16A–16D respectively and with sound order batch 54 containing sound bites from on sound recording medium 32. The batches 82, 84, and 54 remain linked in the batch computer 66 by the unique identification numbers 86, 25A, and 15A. The combined batches 82, 84, 54, and 94 now proceed to block 124 where an index print 126 for each order in batch 76 is printed. Each index print 126A–D has a unique identification number 128A–D which links the index print 126A–D to the respective order envelope 16A–D via the order envelope's unique identification number 18A–D. Likewise the index print's unique identification number 128A–D links the respective index print to the respective unique identification number 20A–D for a specific sound order in sound order batch 54 identifying the sound for that specific order. The batch now proceeds to block 130 where a sound chip 132, created in step 134 is added to the index print. At block 134 sound chip 132 is created from the sound bites recorded for each order on the sound recording medium 32. If the retailer had chosen to send the sound order batch containing the sound recordings from sound cards 14A–D to the photofinishing lab via a modem creating a modem sound order batch 64 that was stored by the batch control computer 66 in the batch computer memory 68, the sound chip 132 is created at block 136 directly from the sound recordings stored in memory 68. The sound chip 132 is attached to the back of the corresponding index print 126 at block 130 to create the sound-on-index-print 140. The resultant print batch 142 of individual prints with their associated sound index print 140, combined with the film negative batch 82 and envelope batch 84 then moves to order finishing step 144 where film strips are cut for separate order, combined with respective individual prints and index prints and placed into envelopes 16A–D to make up the completed sound-on-print with index prints batch 150. The completed sound-on-print batch 150 is then sent back to the retailer at block 152.

Figure 5:
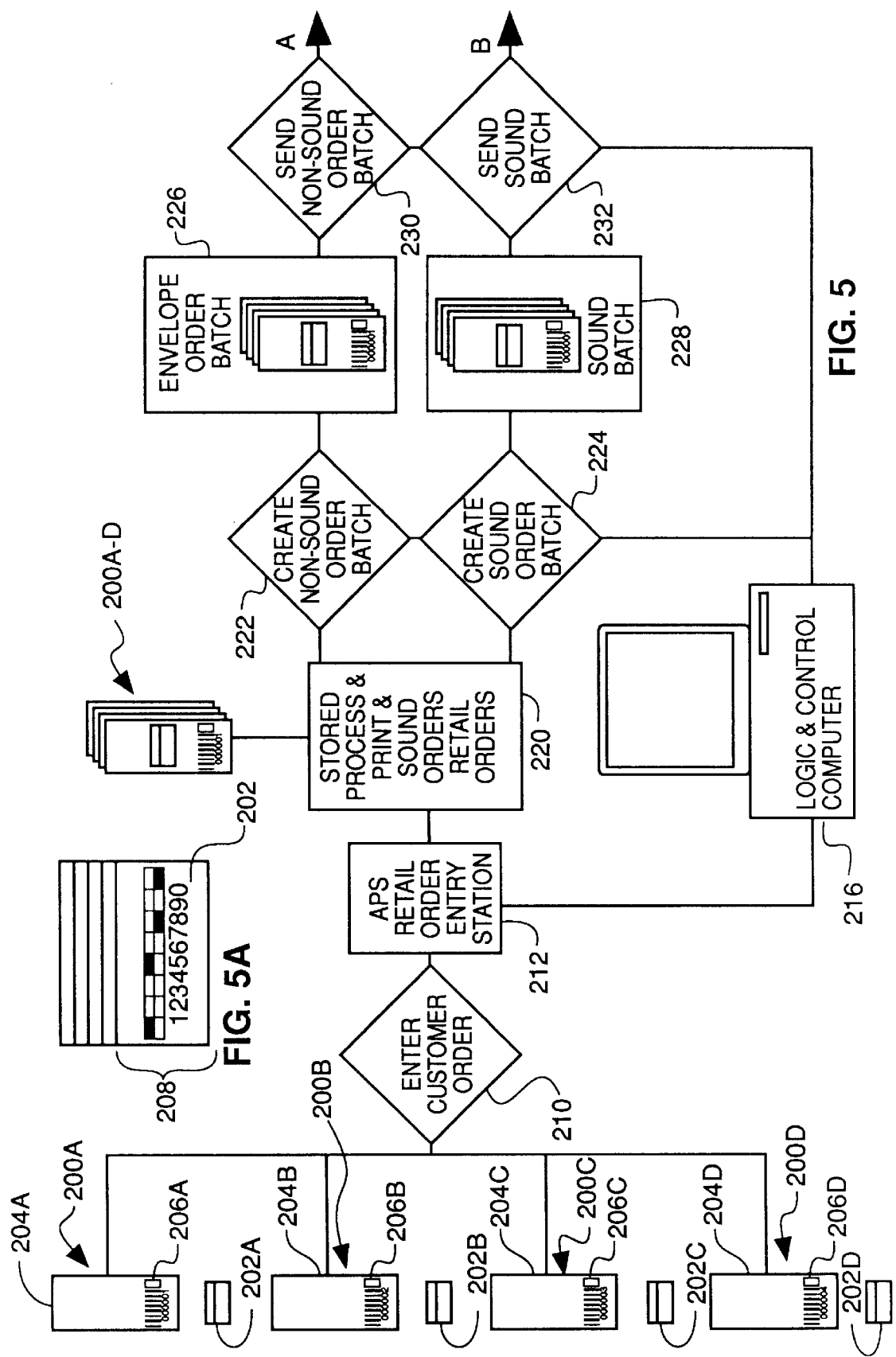
FIGS. 5–8 are flow diagrams similar to those of FIGS. 1–4 illustrating a method of processing sound-on-print orders with APS film.

In FIGS. 5–8, a sound order batch processing method is shown, similar for that of FIGS. 1–4, in which the batching process is tailored to Advanced Photographic System (APS) film which is provided with a magnetic recording layer for recording data on the film in addition to photographic emulsions for capturing images. In addition to recording data relating to photographic picture taking parameters, it has been proposed to record sound on the magnetic layer. FIG. 5 is a flow diagram showing the steps used in creating a batch of APS film sound-on-print photofinishing orders at the retail counter. At the retail counter, the customer hands a cartridge of APS film 202A to the counter clerk and requests processing, indicating that the film contains sound recorded on the film. The film 202A, together with an order envelope 204A provided by the clerk, comprises a sound-on-print order 200A. Four separate orders are shown, 200A–D. Each order envelope 204A–D is conventionally identified by a unique 6 digit bar coded and eye-readable number 206A–D, respectively. In addition, each APS film cartridge is conventionally identified by a unique bar coded and eye-readable cartridge identification number 208, as shown in FIG. 5A. The cartridge ID number is also encoded magnetically on the APS film to match the external ID number 208. The envelope 204 is filled out at step 210. An order entry reader unit 212 is provided at the order entry counter. With this reader, the cartridge is inserted and the leader end of the APS film is thrust out from the APS cartridge in a light tight chamber which is provided with a magnetic read head to reading of magnetic information recorded on the film magnetic layer. The information is sent to a logic and control computer 216. This information consists of the APS sound cartridge's unique ID number and the fact that this is an APS sound film order is determined from encoded information on the film. The customer or counter clerk also scans the unique order envelope number 206A into the APS retail order entry unit 212 from which it is sent to the logic and control computer 216 where it is linked in memory directly to the APS sound order cartridge 202. From this point on to arrival at the photofinishing lab, the customer's APS sound film cartridge 202 is inside the envelope 204. The enveloped orders are accumulated at the retail counter as indicated by block 220. At steps 222 and 224, non-sound orders are segregated from sound-on-print orders into batches 226 and 228, respectively, for transfer to the photofinishing lab at steps 230 and 232, respectively.

Figure 6:
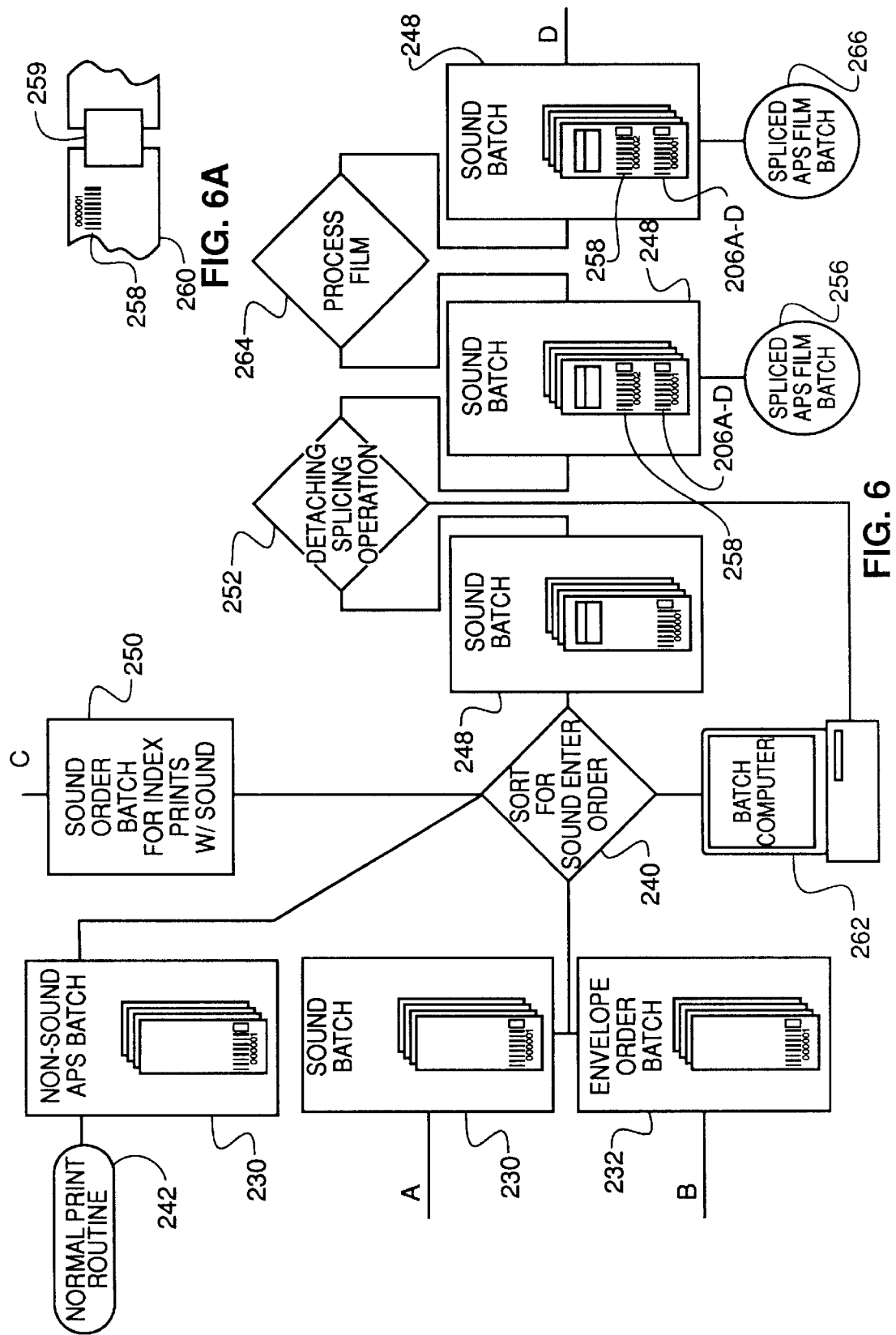

FIG. 6 shows the continuation of the APS sound-on-print routine from the receipt of the orders through the processing (development) of the film. The APS sound and non-sound order batches 230 and 232 can be transported to the photofinisher via van or truck. As the photofinishing lab receives the batches 230 and 232 from the retailers, the batches are sorted at block 240 which represents the sorting of the order into APS non-sound orders 230 sent to normal print routine 242, sound orders 248 in which the sound will be associated with each individual print, and sound orders 250 in which the sound will be associated with an APS index print. APS sound order batch 250 are sent to the branch designated "C". APS sound order batch 248 is sent to the detach and splicing operation designated by block 252. At the detaching and splicing operation, the cartridges are removed from the envelopes, the films are removed from the cartridges and spliced into a continuous web using splice tape 259 wound on a reel to form a spliced film batch 256. At the detaching and splicing operation 252 the order envelopes are linked via a unique identification number 258 on each film 260 as shown in FIG. 6A. The unique identification number 258 on the film 260 matches the unique identification number 208 on the APS sound film cartridge 202 as shown in FIG. 5. The unique identification number 258 was printed on the APS sound film 260 at the time of manufacture in bar coded and eye-readable form and is also recorded magnetically on the APS film magnetic layer at the time of manufacturing. The ID number 258 is printed on the envelope at the attach/ detach splicing station 252 and is also linked to the envelope via a batch computer 262. The sound for each order is recorded on the APS sound film in latent image form or in magnetic form at the time the images were taken. The APS sound film batch 256 is now processed in a film processor designated by block 264. The APS sound film batch 256 now becomes the APS sound negative batch 266. The negative batch 266 combined with the envelope batch 248 now branches to "D".

Figure 7:
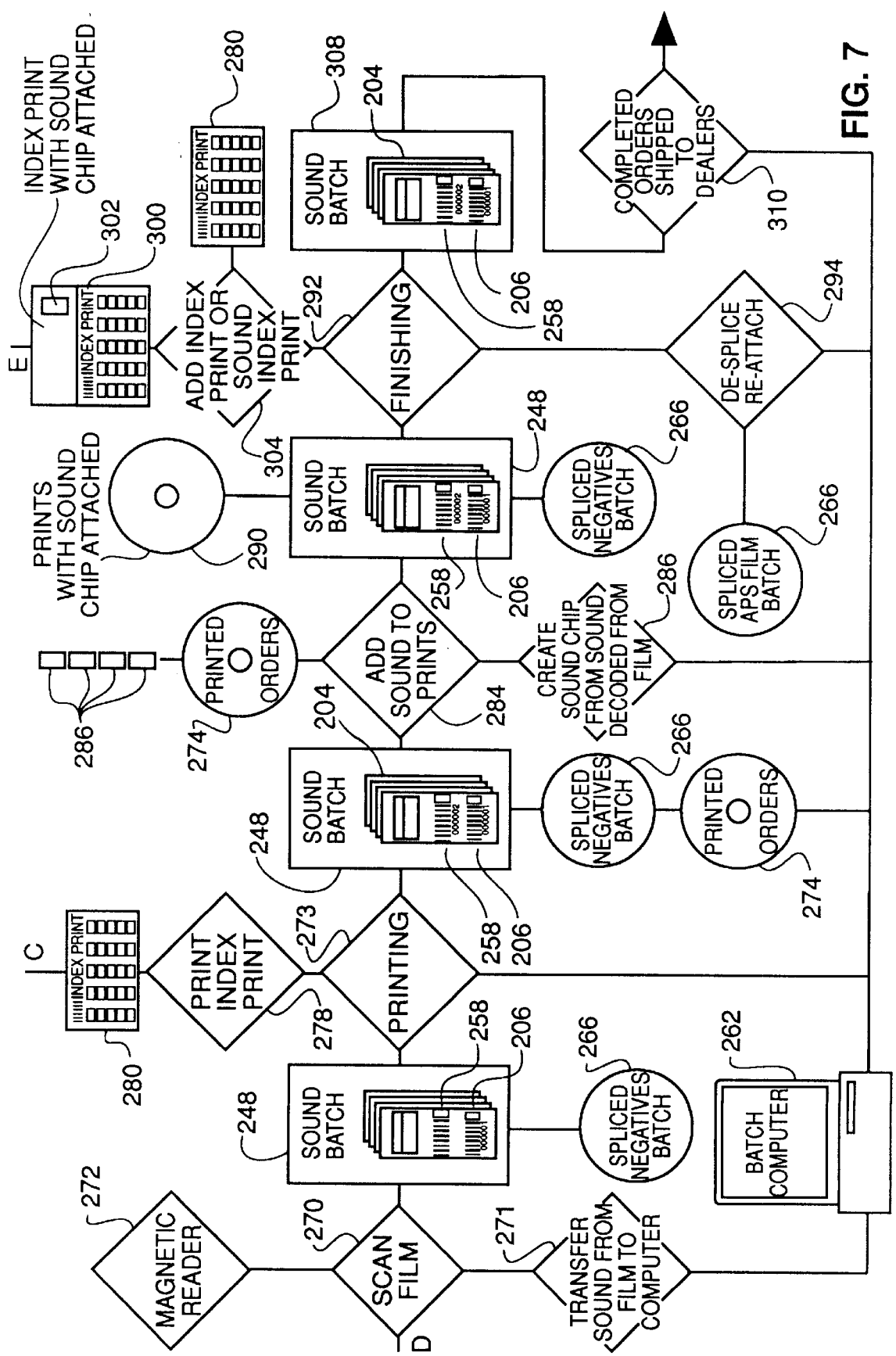

Now referring to FIG. 7, there is shown the continuation of the flow diagram through the photofinishing lab to the point at which the completed orders are returned to the retail dealer. The APS batch of sound-on-print orders 248/266 are characterized by the fact the sound associated with each print will be attached to the associated print. The spliced and processed APS sound film order batch 266 is optically scanned at step 270 using a scanning device such as the Kodak CLAS Digital Film Scanner. During film scanning, the sound data recorded on the APS film is decoded and sent in step 271 to storage in memory of batch computer 262, and is linked to the correct film order using the unique APS film identification number 258. After scanning and reading the magnetics, the spliced film now goes to block 275 where the image negatives are then printed onto photographic paper. If the sound was magnetically written on the film, the sound is read from the APS magnetic film layer at the magnetic reader, step 272, using the magnetic reader on the Kodak CLAS Film Scanner. A set of prints for each order is made at printing block 273 forming the APS print order batch 274. At the same time an APS index print 280 may be printed at block 278 using an electronic printer driven by the image scan data obtained during the APS negative scanning step at block 270. Following printing, the APS negative batch 266 is reunited with envelop batch 248 which contains the envelopes 204 and the empty APS sound film cartridges 202. At all times in these steps of flow diagram, the envelopes, film and stored sound information remain linked in the batch computer 262 by the unique identification numbers, 206 and 258. The combined batches 248, 266 and 274 now proceed to block 284 where EPROM sound chips 286 are created in step 286 from the sounds recorded on the APS sound negatives that were stored in the batch computer 262. The sound chips 286 are attached to the back of each print at block 284 creating sound print batch 290. The batch 290 of APS sound prints is combined with the APS negative batch 266, containing the spliced APS negative films, and batch 248, containing the envelopes 204. These combined batches proceed to the finishing operation block 292. As part of the finishing operation 292 the spliced APS negative batch 266 is despliced and each roll is re-attached to and wound into their respective APS sound film cartridge at step 294. The re-attached APS negatives with cartridges are reunited with the APS sound prints cut from the print with sound batch 290. In addition, the APS index print 280 without sound or an APS index print 300 with a sound chip 302 attached as described below is combined with the appropriate order at step 304 and placed into envelopes 204 forming the completed APS sound-on-print batch 308. The completed sound-on-print batch 308 is then returned to the retailer at step 310.

Figure 8:
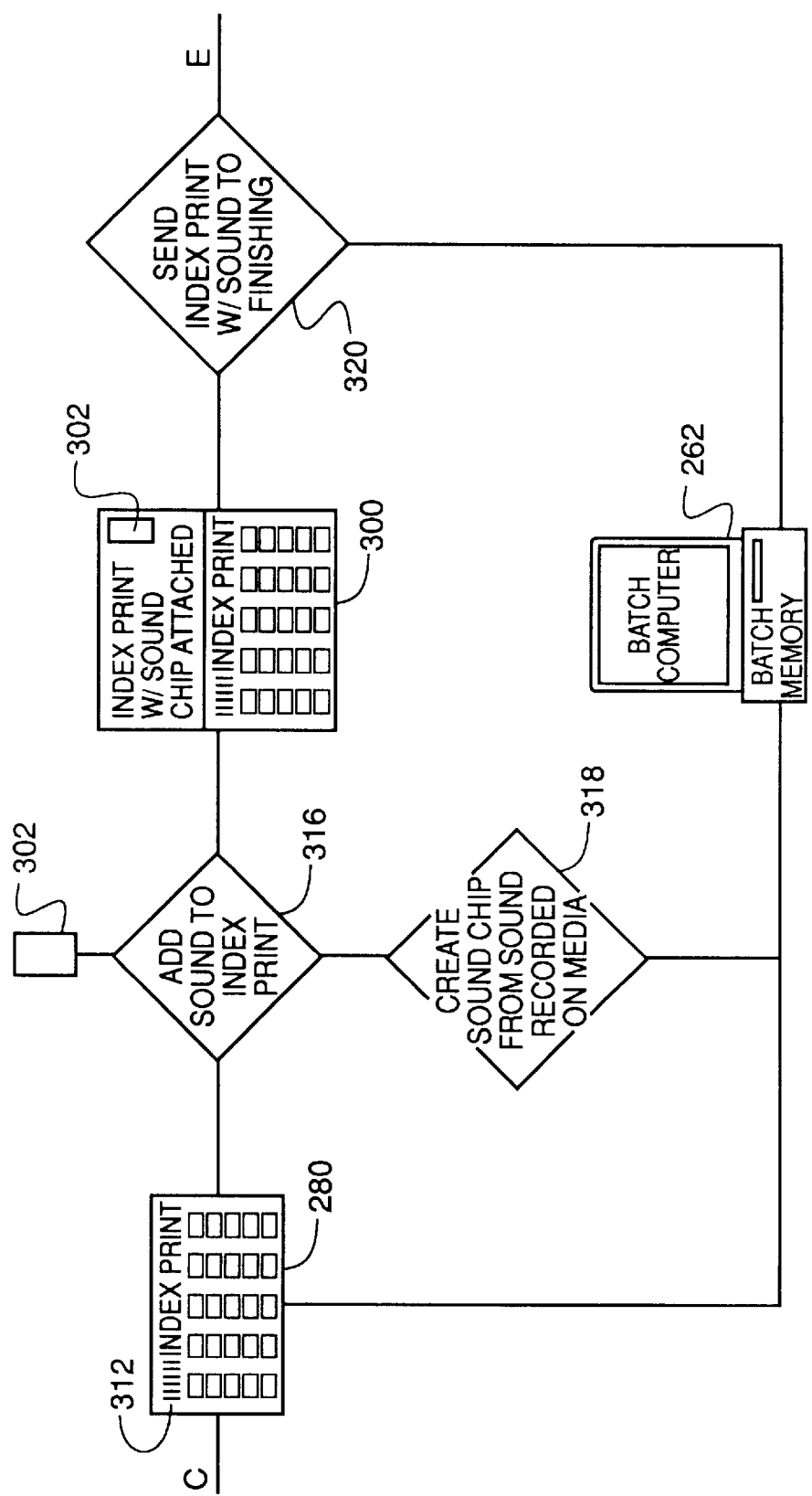
Figure 9:
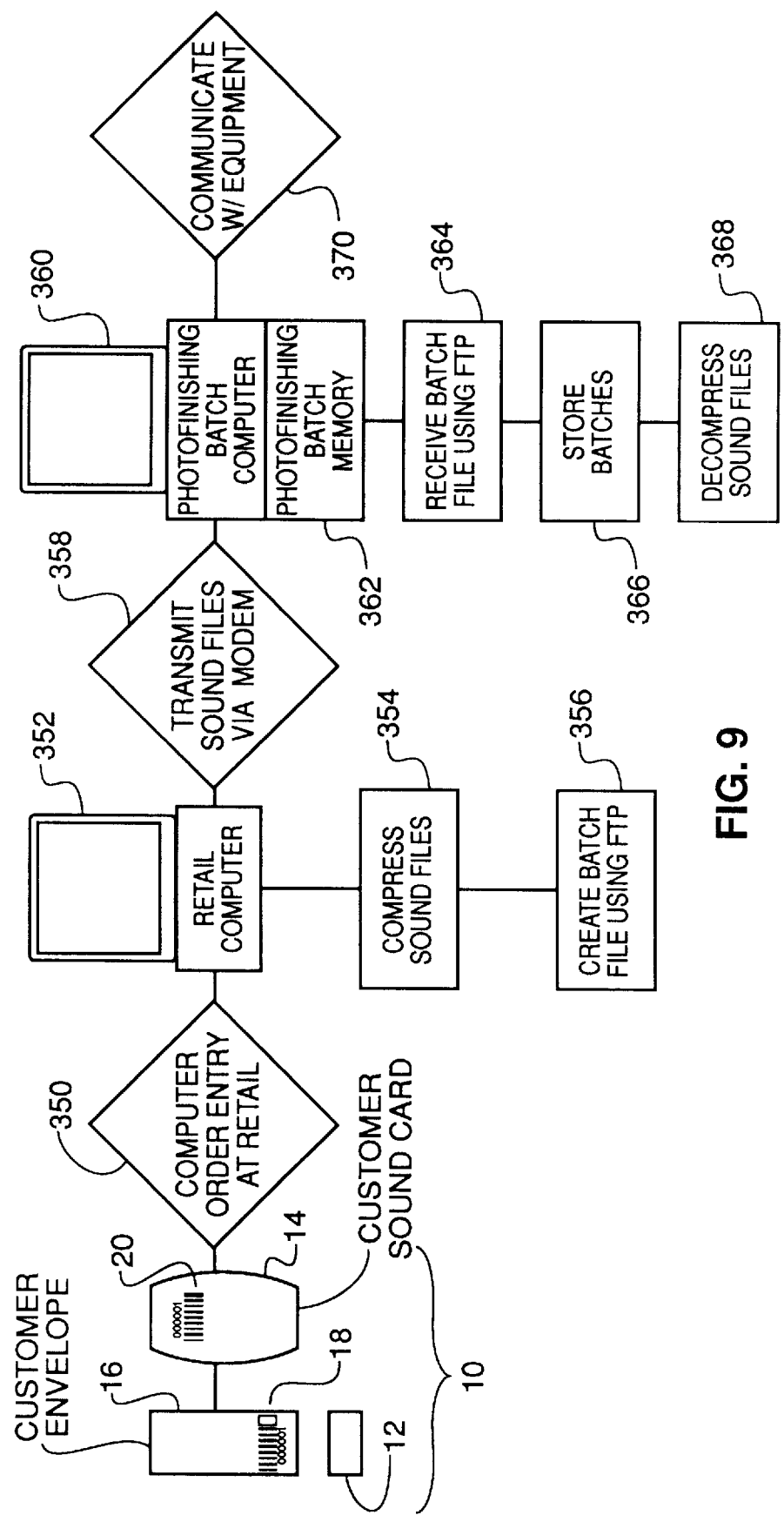
FIG. 9 is a flow diagram showing further details of a routine for retail order entry and initial processing of sound-on-print orders in which sound bites have been recorded at the camera on a removable sound card.

In FIG. 8, branch "C" of the flow diagram from FIG. 7, shows the route taken by an APS index print though the photofinishing lab for a batch of APS sound-on-print orders characterized by the fact that all the sounds for the order are to be recorded onto one sound chip and attached to an APS index print for that order. The APS index print 280 contains all the images for that APS order. The APS index print 280, printed at step 278 (FIG. 7), is provided with a unique identification number 312 which links, via batch computer 262, the index print 280 to the envelope ID numbers 206 (FIG. 7) and the film number 258 (FIG. 6A). The APS index print 280 now proceeds to block 316 where the sound chip 302 is added to the APS index print 280 to create a combined index print with sound 300. At block 318 sound chip 302 is created from the sound recorded on the APS sound negative which was previously read, decoded, and stored in the batch computer 262 when the APS negative was scanned at block 270 (FIG. 7) or read magnetically at block 272. The sound chip 302 is attached preferable to the back the corresponding APS index print 280 at step 316. At step 320, the APS sound index print 300 is sent to step 304 (FIG. 7) for combining with the order batch.

Turning now to FIGS. 9–12, further details concerning the order entry and sound bite downloading procedures will be discussed. There will be described here a routine illustrating how sound data files are created and transmitted from the retailer to the photofinishing via a modem. In this description, the sound-on-print order 10 presented to the retail order clerk is presumed to comprise a film cartridge 12 and a sound card 14 on which sound bites associated with one or more images on the film have been recorded at the camera. As described above, the film cartridge is placed in an order envelope 16 which is identified by a unique 6 digit bar coded and eye-readable number 18. Each sound card 14 is identified by a unique bar coded and eye-readable number 20. The unique sound card number 20 is also encoded electronically in the card and matches the bar coded and eye-readable number on the outside of the card. The envelope 16 is filled out at the customer order entry point 350. The retail counter clerk enters the order information into the retail computer/cash register 352. The computer 352 uses a File Transfer Protocol (FTP) to create a file using the unique 6 digit bar coded and eye-readable envelope number 18 as the file identifier. This number may be scanned into the computer using a hand-held laser scanning device (not shown). Several FTP programs are available such as Anarchie and Fetch for Macintosh and Chameleon and Microsoft for PC's. When the file is created, the sound is down loaded from the sound card 14 and the file is preferably compressed (step 354) using a loss-less audio compression program such as Zip or Compress. The compressed sound file is then stored by the computer 352 under the file identifier number corresponding to the envelope number 18. Each subsequent order is filed in the same manner. After an appropriate number of orders are accumulated, they are combined into a batch (step 356) which is identified with a batch number by the computer 352. The batch of compressed sound files is then transmitted via a modem in step 358 to a batch computer 360 at the photofinishing lab using the appropriate FTP program. Built into the File Transfer Protocol program is a Transmission Control Protocol (TCP) program which keeps track of the data being transferred and presents an error message if any data is lost. The photofinishing batch computer 360 receives the transmitted sound batch files (step 364) and stores them (step 366) in the batch computer memory 362 using the specific batch number. As the specific orders are handled by the photofinishing lab as indicated by block 370, each piece of equipment uses the unique 6 digit bar coded and eye-readable number 18 to access information about that order. When the sound chip is to be made (step 104, FIG. 3), the photofinishing batch computer 66 decompressed the appropriate sound file (step 368) and sends the sound file to be programmed into the sound chip.

Figure 10:
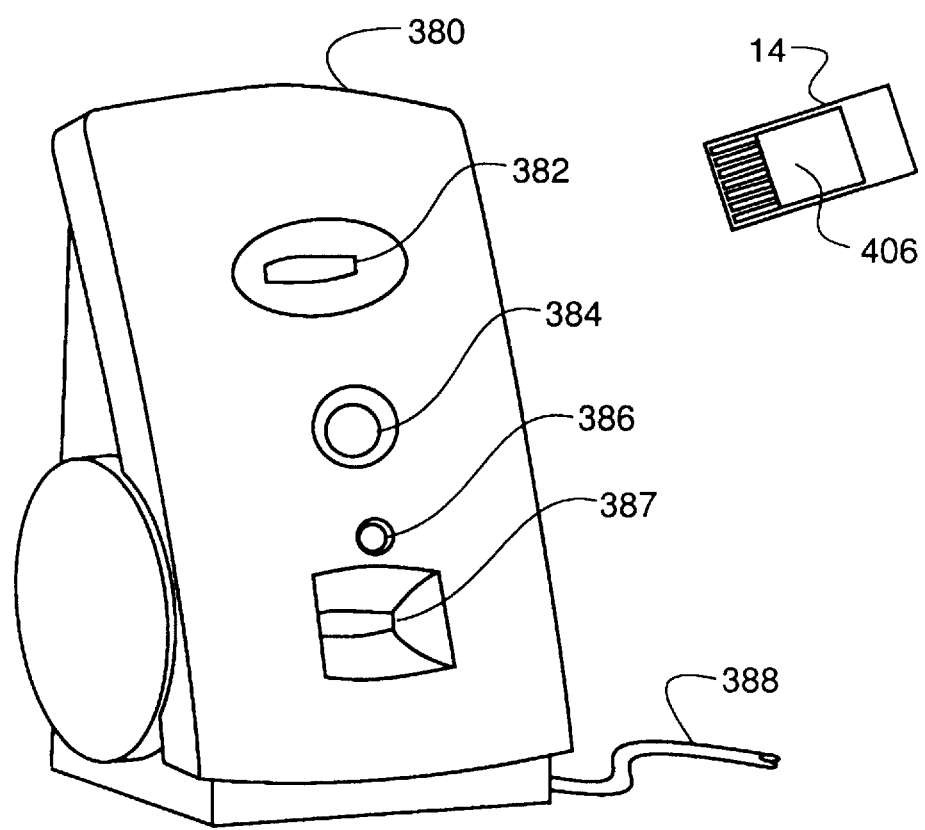
FIG. 10 is a perspective drawing of a sound card reader useful in a retail order entry station adapted for sound-on-print orders.
Figure 11:
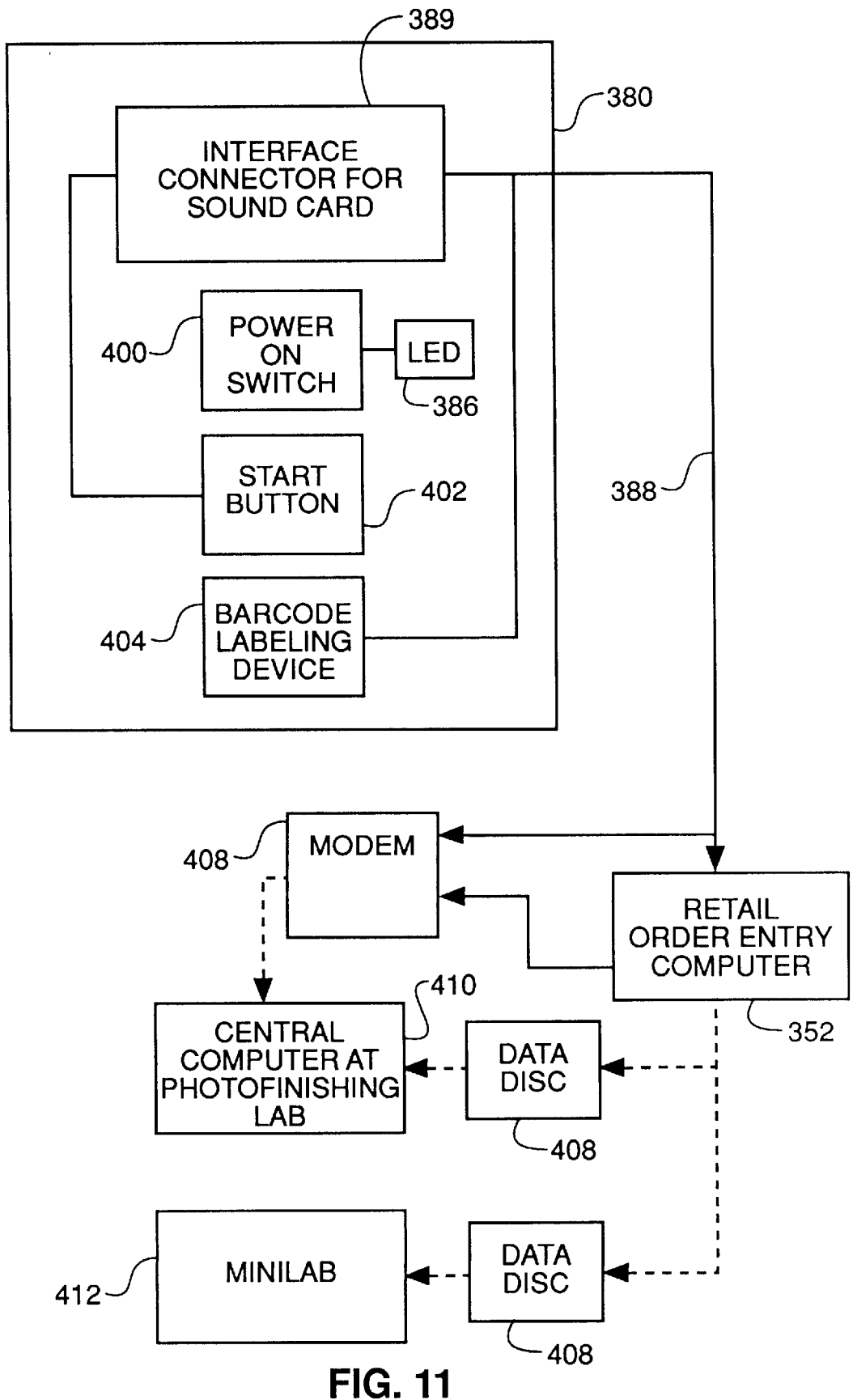
FIGS. 11 and 12 are flow diagrams illustrating details of alternative order entry methods for sound-on-print orders.
Figure 12:
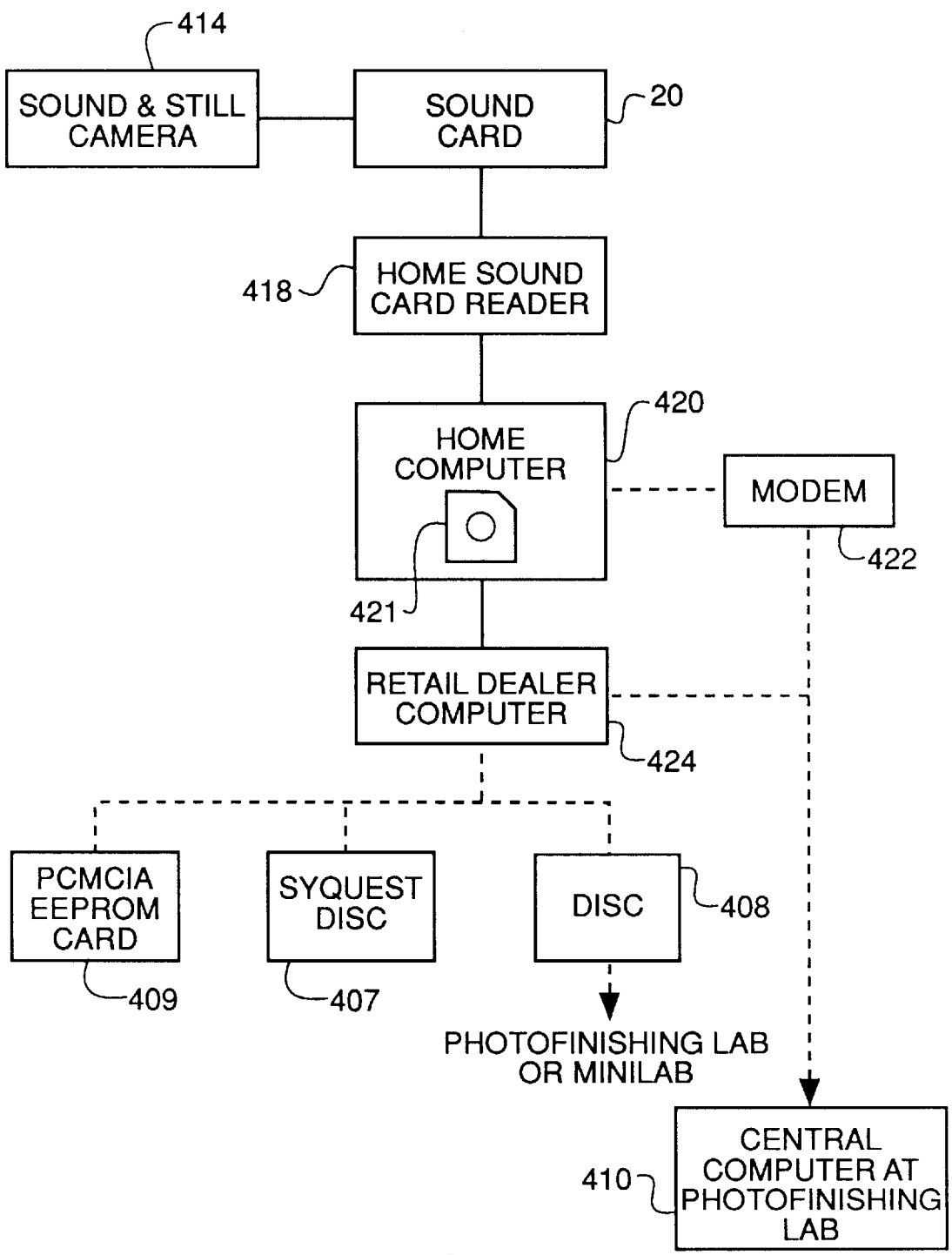

In FIG. 10, there is shown a sound card reader 380 suitable for use in downloading data from a camera sound card 14. The sound card reader is provided with a slot 382 configured to receive sound card 14. Operator interface includes a start button 384 and an LED 386 indicating power on status. A cable 388 attaches to the computer at the order entry counter that downloads and stores the digital information from the sound card 14. Slot 387 is provided for ejecting printed bar code labels internally generated in the sound card reader device. In FIG. 11, a schematic block diagram is shown in which the sound card reader 380 is provided internally with a card interface connector 388 for receiving the sound card inserted in slot 382. A feeler switch 400 is employed to sense the presence of a card inserted in slot 382 and provide power to the reader. When start button 402 is depressed after a sound card is inserted into the reader, the digital information recorded in the sound card memory chip 406 (FIG. 10) is downloaded to the computer 352 for temporary storage either on an internal hard drive or on conventional removable data disc media 407, 408 or 409. The downloaded data can be communicated from computer 352 or directly from the sound card reader 380 via a modem 422 to a central batch computer 410 at a photofinishing lab. The downloaded data may also be communicated to a central lab or a minilab 412 via the data disc media transported by van along with the photographic film cartridge batch. When downloading is complete, the computer will activate the conventional bar code labeling device 404 which can be either internal or external to the card reader. The generated bar code label with the unique order number can then be attached to the customer order envelope 16 (FIG. 1) to uniquely identify the order as a sound order and to link the film to the downloaded sound file. FIG. 12 shows a modification of the order entry procedure in which the sound card 14 from a sound and still camera 414 is inserted in a basic sound card reader 418 connected to the photographer's home computer 420 for downloading of the sound data to the computer. From there, the data, which includes the unique sound card number, can be communicated directly via modem 422 to the photofinishing lab computer 410 with the cartridge mailed in separately. Alternatively, it can be recorded on removable memory disc 421 which can taken to a retail order entry station 424 for downloading into the dealer computer and batched as described above. Disc 421 may also be mailed with the film cartridge directly to a photofinishing lab.

Figure 13:
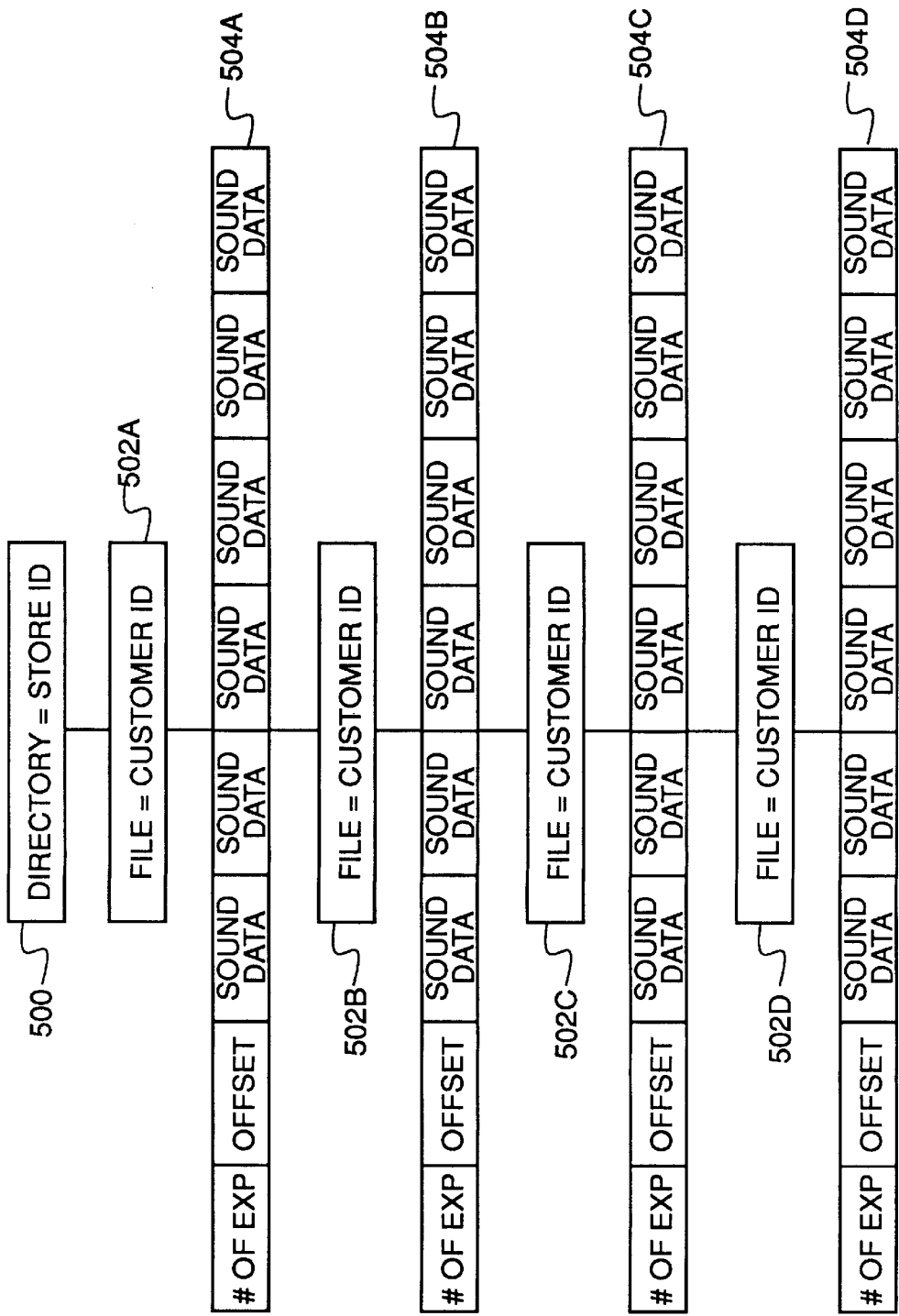
FIG. 13 is a diagram showing the file structure of a sound data file as it would be transmitted from a retail order station to a photofinishing lab.

In FIG. 13, there is shown a diagram of a file structure for a sound data file as it would be transmitted from the retailer to the photofinisher. The sound on print sound data is configured to begin with a directory 500. The directory identifies the store where the data originated. The store ID is made up of eight digits followed by a three digit extension, the time and the date. Under the directory are the individual customer sound files 502A–D. Each file 502A–D is identified by a customer ID identifying the customer who submitted the order. The customer ID is made up of eight digits followed by a three digit extension, and the time and date. The eight digits consist of the unique 6 digit bar coded and eye-readable envelope order number 18. The other two digits can be used to designate the order as a sound or non-sound order. The sound data file structure 504A–D for each order begins with the number of exposures in the order, the offset which tells where the sound data for each image in the order is located in the sound data stream, followed by the sound data itself.

The invention has been described with reference to one or more preferred embodiments. However, it will be appreciated that variations and modifications can be effected by a person of ordinary skill in the art without departing from the scope of the invention.

| PARTS LIST | |
|---|---|
| 10A-D sound-on-print orders | 94 print order batch |
| 12A-D film rolls | 100 add-sound-to-print |
| 14A-D sound cards | step |
| 16A-D order envelopes | 102 sound chip creation |
| 18A-D order ID number | block |
| 20A-D sound card ID number | 104 sound chip to print |

-continued

PARTS LIST

| | | | |
|---|---|---|---|
| 30 | retail order entry point | | attachment |
| 32 | sound storage medium | 108 | batch of prints with sound chip attached |
| 34 | retail order entry logic and control computer | 110 | finishing operation step |
| 40 | retail counter storage point | 115 | completed sound-on-prints batch |
| 42 | envelope batching step | 120 | film processing step |
| 44 | sound batch combining step | 122 | film to paper print step |
| 50 | accumulated order batch | 124 | index printing step |
| 52 | envelope order batch | 126 | index print |
| 54 | sound order batch | 128 | index print ID number |
| 55 | sound order batch ID number | 130 | add sound chip to index print step |
| 56, 58 | order send blocks | 134 | createsound chip |
| 60 | order batch | 140 | sound-on-index-print |
| 62 | modem transmission of sound order batch | 142 | print batch with index prints |
| 64 | modem sound order batch | 144 | order finishing step |
| 66 | photofinisher batch computer | 150 | completed sound index print orders |
| 68 | batch computer memory | 152 | completed sound index print orders send to dealers |
| 70 | sort step | 200A-D | APS sound-on-print film order |
| 72 | non-sound orders | 202A-D | APS film cartridge |
| 74 | orders for sound with individual prints | 204A-D | order envelope |
| 76 | orders for sound with index prints | 206A-D | order envelope ID number |
| 78 | normal photofinishing line | 208 | cartidge ID number |
| 80 | film order splicing operation | 210 | APS order entry step |
| 82 | spliced film batch | 212 | order entry reader unit |
| 84 | envelope (without film) batch | 216 | logic and control computer |
| 86 | film splice ID number | 220 | order accumulation step |
| 88 | film splice | 222 | create APS non-sound order batch |
| 90 | film developing step | 224 | create APS sound order batch |
| 92 | film-to-paper printing step | | |
| 226 | APS non-sound order batch | 310 | batch return to dealer step |
| 228 | APS sound order batch | 312 | index print ID number |
| 230, 232 | send batches to photofinishing lab | 316 | add sound chip to index print step |
| 240 | sort sound/non-sound orders | 318 | create sound chip step |
| 242 | normal print routine | 320 | send sound index print to finishing |
| 248 | sound-on-print orders (individual prints) | 350 | computer order entry |
| | | 352 | retail computer |
| 250 | sound-on-print orders (index prints) | 354 | compress sound files |
| | | 356 | create batch files |
| 252 | film detaching splicing step | 358 | transmit sound files |
| | | 360 | photofinishing batch computer |
| 256 | spliced film batch | | |
| 258 | order ID number | 362 | batch computer memory |
| 259 | film splice | 364 | receive sound files |
| 260 | APS film | 366 | store sound files |
| 262 | batch computer | 368 | decompress sound files |
| 264 | film process step | 370 | process equipment interface |
| 266 | spliced film sound negative batch | 380 | sound card reader |
| 270 | film scan step | 382 | card slot |
| 271 | scan data transfer to memory in batch computer | 384 | start button |
| | | 386 | LED |
| | | 387 | bar code label slot |
| 272 | magnetic reading step | 388 | computer interface cable |
| 273 | film to paper printing step | 389 | card interface |
| | | 400 | power ON switch |
| 274 | APS print order batch | 402 | start switch |
| 278 | index printing step | 404 | bar code label device |
| 280 | index print | 406 | sound card memory chip |
| 284 | add sound to prints step | 407 | Syquest disc |

| | | | |
|---|---|---|---|
| 286 | create sound chips step | 408 | disc |
| | | 409 | PCMCIA EEPROM card |
| 290 | prints batch with sound chips attached | 410 | lab batch computer |
| | | 412 | minilab |
| 292 | finishing step | 414 | sound and still camera |
| 294 | film desplice and reattach to cartridge | 418 | sound card reader |
| | | 420 | home computer |
| 300 | index print with sound chip attached | 422 | modem |
| | | 500 | directory |
| 302 | sound chip | 502A-D | customer sound files |
| 304 | index print add step | | |
| 308 | final sound-on-print batch | 504A-D | customer sound data file structure |

What is claimed is:

1. A method of processing customer film photofinishing orders in which a film order also includes sound information recorded in association with images captured on the film; the method comprising the steps of:

establishing identification data in a manner which links the recorded sound information with the customer film order;

transferring said film order to a photofinishing laboratory;

transferring said linked recorded sound to the photofinishing laboratory;

processing said film order at the photofinishing laboratory to produce image prints from said film images;

transferring said recorded sound information to at least one print attachable sound recording medium using said order identification data to link said sound recording medium to its associated film order;

attaching said sound recording medium to an image print in the associated film order to create one or more sound-on-prints from the film order; and returning s aid film order with said sound-on-prints.

2. The method of claim 1 wherein said identification data is established at a retail order entry station.

3. The method of claim 1 wherein said retail order entry station is at a remote location from said photofinishing laboratory.

4. The method of claim 1 wherein said sound information is recorded at a camera on a removable memory card; said memory card is sent with the film order to the photofinishing laboratory; said recorded sound information is transferred from the sound card to said sound recording medium at the photofinishing laboratory; and said sound card is returned to said customer with said film order completed.

5. The method of claim 1 wherein said sound information is recorded at a camera on a removable sound card; said sound information is downloaded from said sound card to an intermediate sound storage medium; said intermediate sound storage medium is transferred to said photofinishing laboratory; and said sound information is transferred from said intermediate storage medium to said print attachable sound storage medium at the photofinishing laboratory.

6. The method of claim 1 wherein said sound information is recorded in a camera in an integral camera memory; said sound information is downloaded from said integral camera memory as a sound file linked by said identification number to said film order; and said sound information is transferred from said sound file to said print attachable sound medium at the photofinishing laboratory.

7. The method of claim 6 wherein said downloaded sound file with said linking identification number is electronically communicated directly to the photofinishing laboratory.

8. The method of claim 6 wherein said downloaded sound file with said linking identification number is recorded on an intermediate sound recording medium which is transferred along with said film order to the photofinishing laboratory.

9. The method of claim 5 wherein said identification data is established at a retail order entry station; and said sound information is downloaded from said sound card to said intermediate storage medium at said retail order entry station.

10. The method of claim 5 wherein said identification data is established at a customer personal computer; and said sound information is downloaded from said sound card to said intermediate storage medium at said personal computer.

11. A method of processing customer film photofinishing orders in which the film order has associated therewith sound recorded information recorded at the camera in association with images captured on the film; the method comprising the steps of:

downloading sound information to create a digital sound file;

establishing a customer order number that uniquely links said sound file with its associated customer film order and applying said order identification data to both said film order and said sound file;

transferring the film order to the photofinishing laboratory;

transferring the sound file to the photofinishing laboratory in association with the film order;

processing said film order at the photofinishing laboratory to produce image prints from said film images;

transposing said sound information from the sound file to a print attachable sound memory device; and attaching said sound memory device to at least one image print from said film order identified by said order identification data to create a sound-on-print.

12. The method of claim 11 wherein said downloaded sound file is recorded on an intermediate sound storage medium; said intermediate sound storage medium is transferred to said photofinishing laboratory; and said sound information is transferred from said intermediate storage medium to said print attachable sound memory device at the photofinishing laboratory.

13. The method of claim 11 wherein said downloaded sound file and customer order number sound information is communicated electronically to said photofinishing laboratory.

14. The method of claim 13 wherein said electronic communication is by means of a modem.

15. The method of claim 11 wherein said sound information is recorded at the camera onto a removable sound card; said sound card and film order are presented at a retail order entry station and said sound information is downloaded from said sound card at said retail order entry station by means of a sound card reader.

16. The method of claim 15 wherein said sound file is recorded on an intermediate storage medium; said intermediate sound storage medium is transferred to said photofinishing laboratory; and said sound information is transferred from said intermediate storage medium to said print attachable sound memory device at the photofinishing laboratory.

17. The method of claim 15 wherein said sound information is communicated electronically from said sound card reader to said photofinishing laboratory.

18. The method of claim 1 wherein said step of processing said film order at the photofinishing laboratory includes producing individual image prints from corresponding images on said film and includes the steps of:

producing an index print including a plurality of prints from a corresponding number of images on the film;

for each of the images on the index print having sound information associated therewith, transferring said associated sound information collectively onto a single sound recording medium; and attaching said single sound recording medium to said index prints.

19. The method of claim 1 wherein said order identification data includes at least one of customer identification number and a film frame number for each image frame having sound information recorded in association therewith.

20. A method of processing customer film photofinishing orders in which a film order also includes sound information recorded on the film in association with images captured on the film; the method comprising:

downloading said sound information from the film to create a digital sound file;

associating an order number identifying the customer with the sound file and linking the sound file to the film order;

processing said film order at said photofinishing laboratory to produce image prints from said film images;

recording said sound information from said sound file onto a print attachable sound memory device;

using said linking order number, attaching said sound memory device to at least one image print from the film order associated with said sound file; and returning said film order with said sound-on-prints.

21. The method of claim 20 wherein said film order is presented to an order entry station and said step of downloading is performed at said order entry station.

22. The method of claim 20 wherein said downloading of sound information from the film is performed at the photofinishing laboratory.

* * * * *